(12) United States Patent
Toledo Garcia

(10) Patent No.: US 8,215,154 B2
(45) Date of Patent: Jul. 10, 2012

(54) METHOD FOR LOCATING PRESSURE LOSSES IN VACUUM BAGS

(75) Inventor: Miguel Angel Toledo Garcia, Madrid (ES)

(73) Assignee: Airbus Operations, S.L., Madrid (ES)

( * ) Notice: Subject to any disclaimer, the term of this patent is extended or adjusted under 35 U.S.C. 154(b) by 345 days.

(21) Appl. No.: 12/624,310

(22) Filed: Nov. 23, 2009

(65) Prior Publication Data

US 2011/0061450 A1 Mar. 17, 2011

(30) Foreign Application Priority Data

Sep. 14, 2009 (ES) .................................. 200930690

(51) Int. Cl.
*G01M 3/04* (2006.01)

(52) U.S. Cl. ...................................................... 73/40.7

(58) Field of Classification Search .................. None
See application file for complete search history.

(56) References Cited

U.S. PATENT DOCUMENTS

| 6,508,909 B1 * | 1/2003 | Cerezo Pancorbo et al. ................ 156/306.6 |
| 2007/0113953 A1 * | 5/2007 | Haywood ....................... 156/94 |
| 2010/0170326 A1 * | 7/2010 | Miller et al. .................... 73/49.3 |
| 2010/0283180 A1 * | 11/2010 | De Vita et al. ................. 264/258 |
| 2011/0011164 A1 * | 1/2011 | Terentiev et al. .............. 73/40.7 |

FOREIGN PATENT DOCUMENTS

| JP | 63-24137 A | 2/1988 |
| WO | 2008/088435 A1 | 7/2008 |

* cited by examiner

*Primary Examiner* — Robert R Raevis
(74) *Attorney, Agent, or Firm* — Seed IP Law Group PLLC

(57) ABSTRACT

Method for locating pressure losses in vacuum bags used in the manufacturing of composite material parts, according to which the vacuum bag with a part in its interior coated by airweave at a pressure lower than atmospheric pressure, is exposed to contact with a gas dispersion at atmospheric pressure of solid suspended tracing particles, preferably tar, which in the event of there being pressure losses in the vacuum bag, are deposited in the airweave areas close to them. The contact between the vacuum bag and the gas dispersion is performed preferably through an applier of said gas dispersion over the vacuum bag through an application device, either in open surroundings or in closed surroundings such as an autoclave.

7 Claims, No Drawings

METHOD FOR LOCATING PRESSURE LOSSES IN VACUUM BAGS

FIELD OF THE INVENTION

This invention refers to a method for locating pressure losses in vacuum bags used in the manufacturing of composite material parts and specifically the location of pressure losses in vacuum bags used in the aeronautic industry.

BACKGROUND OF THE INVENTION

The intensive introduction of composites or advanced composite materials in the primary structures of aircraft has become one of the priority objectives in the design and manufacture of a new generation of aircraft, thanks to the possibilities that they provide for their structural optimization.

As is well known, the manufacturing of composite material parts made with polymer resins and fiber reinforcement intended for aeronautic structures involves their curing within a vacuum bag in certain temperature and pressure conditions. It is therefore essential that there be no loss of pressure in the vacuum bag during the curing processes.

Now, since the materials used in the vacuum bags, such as nylon, are materials which are likely to tear, the manufacturing procedures for composite materials have to necessarily include the use of methods for locating pressure losses in the vacuum bags.

The method probably most used in the industry for locating pressure losses in vacuum bags is based upon the use of ultrasound. In fact, the manufacturers of vacuum bags tend to include ultrasound detectors in their catalogs, which convert the ultrasound produced by the pressure losses into audible sounds, which are amplified more the closer the detector is.

There are also other proposals, such as the one described in WO 2008088435, which is based upon incorporating an oxygen sensitive film into the vacuum bag, which changes in appearance when a leak occurs resulting from a loss in pressure, which facilitates its location.

These pressure loss location techniques have significant costs and are not equally adapted to the different sizes of vacuum bags that are used specifically in the aeronautic industry. The ultrasound detectors require a complete inspection of the part, by moving the ultrasound detector close the areas of the part that are likely to have pressure losses. This means significant costs and limits its use to large parts. On the other hand, incorporating a film sensitive to oxygen into the vacuum bag significantly increases its cost.

This invention is directed towards solving those problems.

SUMMARY OF THE INVENTION

One of the purposes of this invention is to provide a method for locating pressure losses in vacuum bags used in the manufacturing of composite material parts, which is easy to execute and at a low cost.

The other purpose of this invention is to provide a method for locating pressure losses in vacuum bags used in the manufacturing of composite material parts that are subject to use in the different phases of the manufacturing process of composite material parts.

Those and other purposes are achieved with a method whereby the vacuum bag with a part in its interior, coated by airweave at a pressure lower than atmospheric pressure, is exposed to contact with a gas dispersion at atmospheric pressure of solid suspended tracing particles, which, in the case of there being pressure losses in the vacuum bag, deposit themselves in the areas of the airweave closest to them.

In a preferred embodiment of this invention, the gas component of said dispersion is air and the tracing particles are tar particles with a size between 0.1 and 1 microns. An innocuous dispersion is thereby achieved with a great tracing capacity that facilitates immediate location of the pressure losses.

In another preferred embodiment of this invention, the contact between the vacuum bag and the gas dispersion is performed by projecting said gas dispersion over the vacuum bag through an application device in open surroundings. A location method for pressure losses is achieved with this, at the manufacturing stages of composite material parts that take place in open surroundings.

In another preferred embodiment of this invention, the contact between the vacuum bag and the gas dispersion takes place in closed surroundings, more specifically in an autoclave, by injecting said gas dispersion into the same. A method for locating pressure losses is achieved with this, which is easy to execute before performing the curing stage in the autoclave.

Other characteristics and advantages of this invention will come from the following detailed description of the same.

DETAILED DESCRIPTION OF THE INVENTION

The vacuum bags used for the manufacturing of composite material parts are made up of different types of plastic materials, depending on the maximum usage temperature and its elongation capacity until breaking. The range of temperatures can comprise between 120°-420° and its elongation capacity may reach 500%. Different materials are used for this, such as nylon, polyolefin, polyamide or thermoplastic elastomers in one or several layers.

The applicant for this invention has observed that during the manufacturing of composite material parts, pressure losses take place that are small in scale and very difficult to locate using the known methods. The existence of these losses can be easily detected through pressure measurements on the inside of the vacuum bag, but locating them can be very difficult, particularly in the case of large bags by using the known methods, particularly the ultrasound detectors.

According to this invention, that problem is resolved by exposing the vacuum bag to contact with a gas dispersion at atmospheric pressure of solid suspended tracing particles, which, in the case of there being pressure losses in the vacuum bag, deposit themselves in the airweave placed on the part, thanks to the pressure differential and the ability of said airweave to receive and retain said particles. This facilitates the location of the area of the vacuum bag where the pressure loss is taking place.

The gas dispersion must in all cases be an innocuous dispersion that can be used in the working environment of a factory devoted to the manufacturing of composite materials, avoiding any type of damage to people and any type of disturbance to the devices present in the factory.

In a preferred embodiment of the invention, the gas component of the dispersion is air and the solid particles in suspension are tar particles with a size between 0.1 and 1 microns that have a great tracing capacity. Their dark color provides the level of contrast required with the colors of the vacuum bags.

In a preferred embodiment, the locating of pressure losses according to this invention is performed through open surroundings, with said surroundings being understood to be the factory surroundings where the part is manufactured, i.e. at any time of the manufacturing process before it is introduced into closed surroundings such as an autoclave. In that case, an application device is used for the gas dispersion, from the aerosol-type devices that allow the projection of flows from the same to different areas of the vacuum bag.

In another preferred embodiment, the locating of pressure losses according to this invention is performed inside the autoclave, which will have an intake for this purpose that allows said dispersion to be injected within the surroundings. In this manner, quick location of the areas where there are pressure losses is facilitated before operating the autoclave.

In the preferred embodiments that we have just described, those modifications can be introduced that are comprised within the scope defined by the following claims.

The invention claimed is:

1. A method for detecting leaks in vacuum bags used to manufacture composite parts, the method comprising:
   providing a composite part covered by an aerating fabric in the interior of a vacuum bag;
   subjecting the interior of the vacuum bag to a pressure lower than atmospheric pressure; and
   exposing an exterior of the vacuum bag to a gas dispersion of solid suspended tracing particles such that, when a leak in the vacuum bag is present, the tracing particles are deposited in an area of the aerating fabric proximate the leak.

2. The method of claim 1 wherein a gas component of said gas dispersion is air.

3. The method of claim 1 wherein a diameter of said solid suspended tracing particles is between 0.1-1 microns.

4. The method of claim 1 wherein said solid suspended tracing particles are tar particles.

5. The method of claim 1 wherein exposing the exterior of the vacuum bag to the gas dispersion includes projecting said gas dispersion with an application device over the exterior of the vacuum bag in open surroundings.

6. The method of claim 1 wherein exposing the exterior of the vacuum bag to the gas dispersion is performed in closed surroundings, by injecting said gas dispersion in said closed surroundings.

7. The method of claim 6 wherein an autoclave provides said closed surroundings.

* * * * *